Patented Apr. 16, 1935

1,997,828

UNITED STATES PATENT OFFICE 1,997,828

PIPERIDINE DERIVATIVES AND PROCESS OF PRODUCING THEM

Samuel M. McElvain, Madison, Wis.

No Drawing. Application December 7, 1931, Serial No. 579,647

23 Claims. (Cl. 260—43)

My invention relates to certain piperidine derivatives, and the process of producing them.

The object of the invention is to produce certain synthetic substances which are effective as local anesthetics. Some of these synthetic substances are very highly effective as local anesthetics, and at the same time possess sufficiently low toxicity and sufficiently low irritating properties to make them safely and conveniently practical for clinical use.

These compounds are piperidine derivatives in which the nitrogen-joined hydrogen atom of piperidine has been replaced by a radicle of the general formula (1) 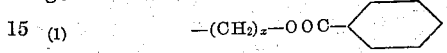

in which $x$ is an integer; and in which one of the carbon-joined hydrogen atoms of piperidine has been replaced by an alkyl radicle in which a hydrogen atom has been replaced by a phenyl radicle; and they may be either the free bases or salts formed from them with acids.

Such a piperidine derivative includes a substance indicated by the following general formula:

(2) 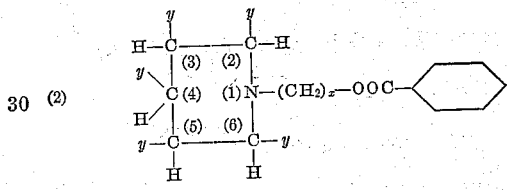

in which $x$ is an integer as stated above, $y$ in four of the five places where it appears is a hydrogen atom, and $y$ in the fifth place where it appears is an alkyl radicle in which a hydrogen atom has been replaced by a phenyl radicle. The formula shows the base, but this base may be combined with an acid to form a salt, as will be explained in greater detail hereinafter; and by the expression "which piperidine compound may be in the form of its salts", as used in the claims, I mean to include both the base and its salts within the terms of the claims.

The particular $y$ which is such substituted-alkyl radicle may be in any one of the five places where $y$ appears in the formula. This is, counting the nitrogen atom as the 1 position, the carbon-joined hydrogen atom which is replaced by such substituted-alkyl radicle may be in the 2 position, the 3 position, or the 4 position; it being obvious that the 6 position and the 5 position indicated are in reality the same as the 2 position and the 3 position respectively.

The substituted-alkyl radicle at such one $y$ is a straight-chain aliphatic radicle with from one to four carbon atoms in the chain, with a substituted or unsubstituted phenyl substituent replacing a hydrogen atom on any one of the carbon atoms of the chain. Thus for a given phenyl substituent, such as the unsubstituted phenyl group, $y$ may be the substituted methyl radicle, or either one of two substituted ethyl radicles, or any one of three substituted propyl radicles, or any one of four substituted butyl radicles.

In the above Formula (2), the group $(CH_2)_x$ does not necessarily indicate strictly the methylene unit taken some integral number of times, but is intended to cover broadly a radicle in which the relation of the total carbon to the total hydrogen is in the proportion indicated. That is, assuming for instance that $x$ equals 3, the expression $(CH_2)_x$ is intended to include not only a bivalent radicle of three methylene groups, but also other bivalent radicles having the same proportion of total hydrogen and total carbon, such as a methyl-substituted ethylene group.

Further, while the $x$ in this formula may be any practically possible integer, I prefer that it be a plural integer less than six (6), desirably two (2) or three (3).

A convenient general process of preparing substances such as shown in the foregoing formula is the following:

A halogen-substituted alcohol is caused to react with either one or the other of the following substances:

(a) a substituted piperidine; and (b) a benzoylating agent, such for instance as benzoic anhydride, or a benzoyl halide.

The compound obtained as a result of the foregoing reaction is then caused to react with the other of said two substances named above—that is, with either the substituted piperidine or with the benzoylating agent, according to which one it was that did not take part in the first-named reaction with the halogen-substituted alcohol.

If the compound resulting from the first-named reaction given above is directly available, without being specially prepared, it can be used as the basis for the second reaction given above; and my claims are intended to cover the second reaction alone as well as the sequence of the two reactions.

In any case, the result of the second reaction is a base, of the general Formula (2) given above. In many instances, this base is relatively insoluble in water, or has too low a water-solubility to be conveniently available clinically. To increase the water-solubility of the substance, it is desirably transformed into a salt, by the combination with it of an acid. Various inorganic acids can be used, such as hydrochloric acid, and various organic acids, such as lactic acid. If hydrochloric acid is used, the salt formed has the following general formula:

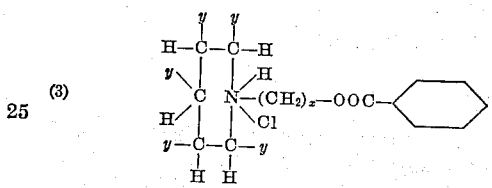

in which $x$ and $y$ have the same significance as before. These salts are quite soluble in water, and are the desirable form in which the substances are used as anesthetics. However, my invention is intended to cover both the bases and the salts.

In some cases, the desired hydrochloride, which is the hydrochloride of a tertiary amine as shown in Formula (3), as first obtained, is contaminated with some of the hydrochloride of the secondary amine—i. e., with some of the hydrochloride of the unchanged piperidine. To purify it, an aqueous solution of it is treated with an excess of alkali, such as sodium hydroxide. The resultant alkaline suspension of the free base is shaken with benzoyl chloride, whereby any unchanged secondary amine present is converted to an amide. The aqueous suspension is extracted with ether; and the desired tertiary amine is precipitated as the hydrochloride from the ether solution.

I give below a convenient and preferred general method of preparation of compounds embodying my invention. Following this preparational procedure are listed a few specific examples of this type of compound together with certain of their physical properties. The temperatures given are centigrade.

I prefer to make the first reaction, when it is used at all, that of a halogen-substituted alcohol with a benzoylating agent, rather than with a substituted piperidine. Thus, for instance, if I wish to get beta-chloroethyl benzoate as a result of the first reaction, I cause a reaction between one molecular equivalent of ethylene chlorohydrin and a slight excess over one molecular equivalent (conveniently about 10% excess) of benzoyl chloride. In a similar manner, with the proper chlorohydrin, I may obtain beta- or gamma-chloropropyl benzoate, beta-, gamma-, or delta-chlorobutyl benzoate, etc.

A mixture of one molecular equivalent of the desired chloroalkyl benzoate, as so prepared, is mixed with two molecular equivalents of the desired 2-, 3-, or 4-(phenylalkyl)-substituted piperidine (such for instance as 2-benzyl piperidine, 2-phenylethyl piperidine, 3-phenylpropyl piperidine, 2-phenylbutyl piperidine, or 4-phenylethyl piperidine) and the mixture is heated. In those cases in which the phenyl-alkyl substituent of the piperidine nucleus is in the 2-position, it is necessary to use a temperature of about 130° to 150° for at least six (6) hours, to cause the secondary amine (or unchanged piperidine) to condense with the halogenated ester. When the phenyl-alkyl substituent is in the 3-position or the 4-position on the piperidine nucleus, however, a temperature of from 100° to 120° for from one (1) to three (3) hours usually suffices for the condensation.

After the heating, the reaction mixture is cooled, and diluted with several volumes of ether. This causes the hydrochloride of any remaining secondary amine—that is, any unreacted 2-, 3-, or 4-(phenylalkyl)-substituted piperidine—to be precipitated. This precipitate is removed by filtration. The ethereal filtrate contains the phenyl-alkyl-piperidino-alkyl benzoate. This may be isolated as such, as the free base shown in Formula (2), and is one of the products which my invention includes. However, it is preferably converted into a salt, such as the hydrochloride; by the addition of the necessary acid, such as gaseous hydrogen chloride, to the ethereal solution, to produce the compound shown in Formula (3). The salt so formed is insoluble in ether, and so precipitates. After removal of the ether by filtration, this salt is desirably recrystallized to a constant melting point.

It sometimes happens that the condensation of the secondary amine and the halogenated ester is so incomplete that the ultimate phenylalkyl-piperidino-alkyl benzoate salt is contaminated with some of the corresponding salt of said secondary amine. When that happens, it is advisable to dissolve the impure salt in water, to make the solution alkaline as with sodium hydroxide, and to shake the resulting aqueous suspension of the free bases with benzoyl chloride. This converts the secondary amine into its benzoyl derivative, while leaving the tertiary amine unchanged. By then extracting the aqueous suspension with ether, and adding acid as was done to the previously obtained ethereal solution, a relatively pure salt of the tertiary amine is obtained.

The following compounds are specific examples of anesthetic substances prepared by the general procedure described above.

1. *Gamma-2-benzylpiperidino-propyl benzoate*

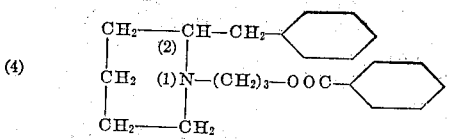

This free base may be obtained as a thick oil by evaporation of the ether from the ethereal solution. It is substantially insoluble in water, but is soluble in ether, benzene, and chloroform.

2. *Gamma-2-benzylpiperidino-propyl benzoate hydrochloride*

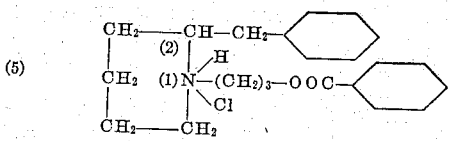

This is a white crystalline solid, which melts at 169° to 171°.

3. Beta-2-phenylethylpiperidino-ethyl benzoate

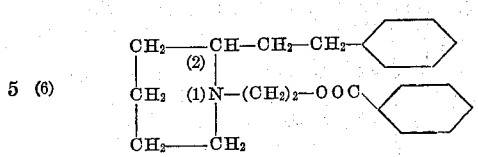

This free base may be obtained as a viscous oil by evaporation of the ether from the ethereal solution. It is substantially insoluble in water, but is soluble in ether, benzene, and chloroform. It boils at 202° to 207,° at an absolute pressure of 1 mm. of mercury. When purified by distillation under diminished pressure, it may be obtained in a very pure form.

4. Beta-2-phenylethylpiperidino-ethyl benzoate hydrochloride

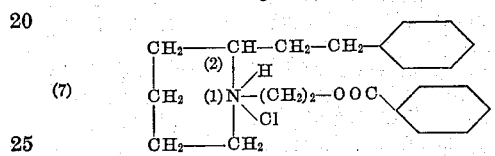

This hydrochloride is an oil. The hydrobromide and the sulphate of the same base are also oils. I have been unable so far to obtain the salts of this base in crystalline form.

5. Gamma-2-phenylethylpiperidino-propyl benzoate

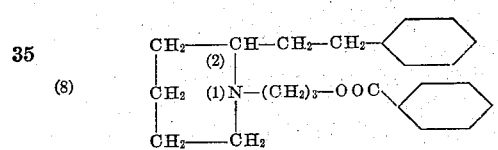

This free base may be obtained as a thick oil by evaporation of the ether from the ethereal solution. It is substantially insoluble in water, but is soluble in ether, benzene, and chloroform. For reasons which appear in the discussion of the hydrochlorides of this base, described in Example 6, the base itself may perhaps be a mixture of two geometric isomers; but if so I have not separated them.

6. Gamma-2-phenylethylpiperidino-propyl benzoate hydrochloride

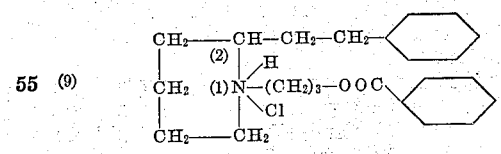

I have isolated two different forms of this hydrochloride, having distinctly different physical and pharmacologic properties. When the base is prepared by heating together the secondary amine (2-phenylethylpiperidine) and the chloro-ester (gamma-chloropropyl benzoate) at 140° to 150° for six (6) hours, two compounds are apparently formed. The hydrochlorides of these two compounds are formed by adding gaseous hydrochloride to the ethereal solution. When the mixture of hydrochlorides thus obtained is recrystallized from an alcohol-ether mixture, it is noticed that one type of crystals forms as a somewhat discolored cake, brown or reddish brown, on the bottom of the flask, while in the supernatant liquid appears a suspended flocculent precipitate of needle-like crystals that are substantially pure white. The two types of crystals are separated, by decanting the supernatant liquid, with the white crystals suspended therein, from the crystalline cake at the bottom of the flask. The separation between the apparently different substances may be made more complete by several recrystallizations. The hydrochloride which appears as the white flocculent precipitate is found to have a melting point of 123° to 125°, while the hydrochloride which appears in the form of the discolored cake at the bottom of the flask is found to have a melting point of 149° to 151°, after further recrystallizations. The melting point of a mixture of the two is indefinite, over a considerable range but between the melting points of the individual compounds. Both of these hydrochlorides have anesthetic properties, both topically and by infiltration. Topically on the rabbit's cornea their effects are not markedly different; but by infiltration into the guinea pig the hydrochloride with the lower melting point is over three (3) times as effective as the other form, measured in duration of anesthesia; while as measured on both white mice and on white rats it has a slightly greater toxicity than the other.

The mixture of hydrochlorides referred to is obtained if the original condensation to produce the tertiary amine is carried out as above described, by heating for six (6) hours at 140° to 150°. Under those conditions, from 12 g. of 2-phenylethylpiperidine (2 mols) and 6.3 g. of gamma-chloropropyl benzoate (1 mol.), I obtain as the final purified hydrochlorides about 1.6 g. of the hydrochloride of the lower melting point and 2.1 g. of the hydrochloride of higher melting point.

However, if the reaction in which the tertiary amine is prepared is carried on for only one (1) hour, but at 200° to 210°, the only hydrochloride obtained is the one of higher melting point.

The two hydrochlorides are probably geometric isomers. The one with the higher melting point appears to be the more stable.

7. Beta-4-phenylethylpiperidino-ethyl benzoate

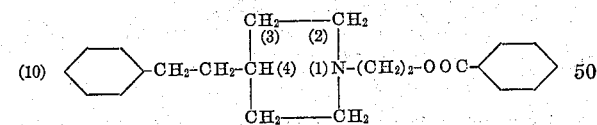

This free base may be obtained as a thick oil by evaporation of the ether from the ethereal solution. It is substantially insoluble in water, but is soluble in ether, benzene, and chloroform.

8. Beta-4-phenylethylpiperidino-ethyl benzoate hydrochloride

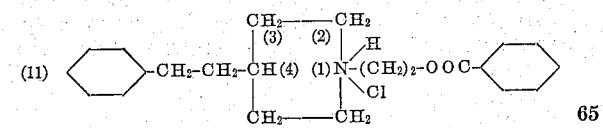

This is a white crystalline solid that melts at 163° to 165°.

The examples given above are merely examples of the various compounds and processes included in my invention. They show in general the type of variations which the invention includes, but are not given as limitations on the generic invention.

I claim as my invention:

1. A piperidine compound of the general formula

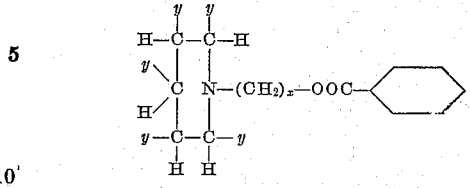

in which $x$ is an integer less than six (6), and $y$ in one place is an alkyl radicle in which a hydrogen atom has been replaced by a phenyl radicle and in each of the four other places is a hydrogen atom; which piperidine compound may be in the form of its salts.

2. A piperidine compound as expressed in claim 1, in which $x$ is a plural integer.

3. A piperidine compound as expressed in claim 1, in which $x$ is two (2).

4. A piperidine compound as expressed in claim 1, in which $x$ is three (3).

5. A piperidine compound as expressed in claim 1, in which the $y$ which is such substituted-alkyl radicle contains less than five (5) carbon atoms besides those included in its phenyl substituent.

6. A piperidine compound as expressed in claim 1, in which the $y$ which is such substituted-alkyl radicle contains one carbon atom beside those included in its phenyl substituent.

7. A piperidine compound as expressed in claim 1, in which the $y$ which is such substituted-alkyl radicle contains two carbon atoms beside those included in its phenyl substituent.

8. A salt of a piperidine compound of the formula set forth in claim 1.

9. An inorganic salt of a piperidine compound of the formula set forth in claim 1.

10. The hydrochloride of a piperidine compound of the formula set forth in claim 1.

11. The process of producing substituted piperidino-alkyl benzoates of the general formula

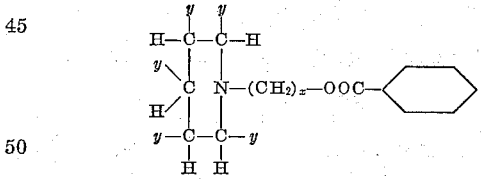

in which $x$ is an integer less than six (6), and $y$ in one place is an alkyl radicle in which a hydrogen atom has been replaced by a phenyl radicle and in each of the four other places is a hydrogen atom; which comprises first causing a reaction of a halogen-substituted alcohol with a benzoylating agent, and subsequently causing a reaction of the result of that first reaction with a substituted piperidine in which a carbon-linked hydrogen of piperidine has been replaced by an alkyl radicle in which one hydrogen atom has been replaced by a phenyl radicle.

12. The process of producing substituted piperidino-alkyl benzoates of the general formula

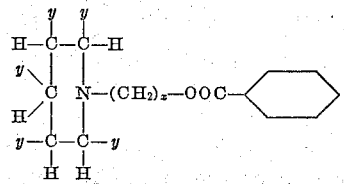

in which $x$ is an integer less than six (6), and $y$ in one place is an alkyl radicle in which a hydrogen atom has been replaced by a phenyl radicle and in each of the four other places is a hydrogen atom; which comprises causing a reaction of a substituted piperidine in which a carbon-linked hydrogen of piperidine has been replaced by an alkyl radicle in which a hydrogen atom has been replaced by a phenyl radicle, with the result of the reaction of a halogen-substituted alcohol and a benzolating agent.

13. A piperidine compound as expressed in claim 1, in which the $y$ which is such substituted-alkyl radicle is the phenyl-methyl radicle.

14. A piperidine compound as expressed in claim 1, in which the $y$ which is such substituted-alkyl radicle is the phenyl-ethyl radicle.

15. A piperidine compound as expressed in claim 1, in which the $y$ which is such substituted-alkyl radicle is the phenyl-ethyl radicle, and $x$ is two (2).

16. A piperidine compound as expressed in claim 1, in which the $y$ which is such substituted-alkyl radicle is the phenyl-methyl radicle, and $x$ is three (3).

17. A piperidine compound as expressed in claim 1, in which the $y$ which is such substituted-alkyl radicle is the phenyl-ethyl radicle, and $x$ is three (3).

18. A piperidine compound as expressed in claim 1, in which the $y$ which is such substituted-alkyl radicle is in the 2-position.

19. A piperidine compound as expressed in claim 1, in which the $y$ which is such substituted-alkyl radicle is the phenyl-methyl radicle and is in the 2-position.

20. A piperidine compound as expressed in claim 1, in which the $y$ which is such substituted-alkyl radicle is the phenyl-methyl radicle and is in the 2-position, and $x$ is three (3).

21. A piperidine compound as expressed in claim 1, in which the $y$ which is such substituted-alkyl radicle is the phenyl-ethyl radicle and is in the 2-position.

22. A piperidine compound as expressed in claim 1, in which the $y$ which is such substituted-alkyl radicle is the phenyl-ethyl radicle and is in the 2-position, and $x$ is two (2).

23. A piperidine compound as expressed in claim 1, in which the $y$ which is such substituted-alkyl radicle is the phenyl-ethyl radicle and is in the 2-position, and $x$ is three (3).

SAMUEL M. McELVAIN.

CERTIFICATE OF CORRECTION.

Patent No. 1,997,828.                                                                 April 16, 1935.

SAMUEL M. McELVAIN.

It is hereby certified that error appears in the printed specification of the above numbered patent requiring correction as follows: Page 4, second column, line 21, claim 12, for "benzolating" read benzoylating; and that the said Letters Patent should be read with this correction therein that the same may conform to the record of the case in the Patent Office.

Signed and sealed this 21st day of May, A. D. 1935.

Leslie Frazer

Acting Commissioner of Patents.

(Seal)